Patented Oct. 27, 1925.

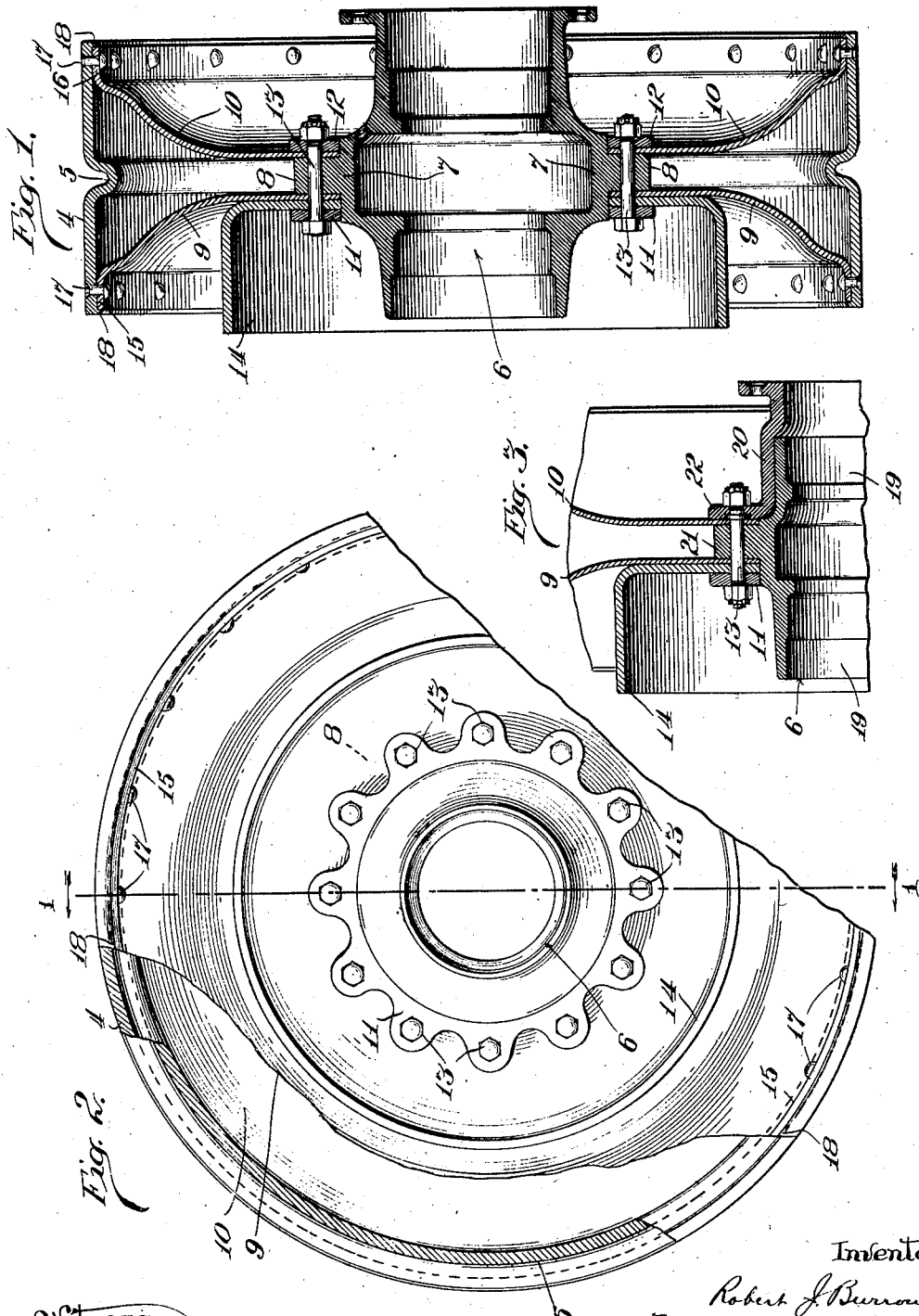

1,558,785

UNITED STATES PATENT OFFICE.

ROBERT J. BURROWS, OF BUCHANAN, MICHIGAN, ASSIGNOR TO CLARK EQUIPMENT COMPANY, OF BUCHANAN, MICHIGAN, A CORPORATION OF MICHIGAN.

METAL WHEEL.

Application filed January 17, 1920. Serial No. 352,072.

*To all whom it may concern:*

Be it known that I, ROBERT J. BURROWS, a citizen of the United States, and a resident of Buchanan, in county of Berrien and State of Michigan, have invented certain new and useful Improvements in Metal Wheels, of which the following is a specification, reference being had to the accompanying drawings.

My invention relates to metal wheels for motor vehicles, and has for its object to provide an improved wheel especially suitable for motor trucks and other vehicles designed to carry heavy loads. To this end it consists in certain improvements in the construction of the wheel rim, and in certain improved combinations, all of which improved features are fully hereinafter described in connection with the accompanying drawings. What I regard as new is pointed out in the claims.

In the accompanying drawings,—

Fig. 1 is a sectional view of my improved wheel taken on line 1—1 of Fig. 2;

Fig. 2 is a side elevation thereof, certain parts being broken away; and

Fig. 3 is a sectional detail showing more particularly an improved hub construction.

My improved wheel comprises a rim 4 in the form of an annular band provided between its margins with a circumferentially disposed inwardly offset portion or bead 5 formed by deflecting or bending inwardly the intermediate portion of the material, preferably at or near the transverse center of the wheel. It is best to make this inwardly projecting bead continuous around the wheel so that it is annular, as illustrated in Fig. 1, although my invention is not limited to making it continuous in all cases. This bead serves to brace and strengthen the intermediate portion of the rim, leaving its outer surface flat so that it is well adapted to receive an outer rim, preferably in the form of a demountable tire carrying rim such as are ordinarily used on motor vehicles.

6 indicates the hub of the wheel, two forms of which are shown. In the form shown in Fig. 1 the hub 6 is provided with an intermediate annular portion 7 carrying an outwardly projecting annular flange 8, at opposite sides of which are fitted the inner marginal portions of two outwardly diverging discs 9, 10 which connect the hub with the rim 4. These discs are held in place by collars 11, 12 fitted upon the intermediate portion 7, and secured together by bolts 13 so that they clamp the inner margins of the discs 9, 10 tightly in place. Where the wheel is used for braking purposes it is provided with a brake drum 14 secured upon the intermediate portion 7 outside of one of the discs, as 9, and held in place by one of the collars, as 11, as shown in Fig. 1.

The outer margins of the discs 9, 10 are bent outwardly to form marginal flanges 15, 16 which fit against the inner portions of the rim 4 adjacent to the margins thereof, to which they are secured by rivets 17, as best shown in Fig. 1. The margins of the rim 4 are bent or spun inwardly to form inwardly projecting flanges 18 which overlap and abut against the marginal flanges 15, 16 of the discs 9, 10 and take the outward thrust thereof. Thus the parts of the wheel are all firmly secured and braced together.

In Fig. 3 I have illustrated a hub of improved construction composed of telescoping members 19, 20. These members when united form a hub similar in a general way to that shown in Fig. 1. The member 19 carries a flange 21 similar to the flange 8 in that it serves as a means for connecting the discs 9, 10 and the brake drum 14 to the hub. The member 20 fits closely upon one end of the member 19 and is provided at its inner margin with a radial flange 22 which fits over the inner marginal portion of the disc 10 and takes the place of the collar 12 shown in Fig. 1. With this type of hub the collar 11 and bolts 13 shown in Fig. 1 are employed and perform the functions hereinbefore described, with the addition that the bolts 13 serve also to hold the two members of the hub together.

So far as I am aware I am the first in the art to provide a wheel rim of the character described with an inwardly projecting annular rib between its margins, or to form such rib by means of a bead integral with the rim, and the claims hereinafter made are, therefore, to be construed accordingly.

What I claim as my invention and desire to secure by Letters Patent, is:

1. A metal wheel comprising in combination an integral rim having an intermediate inwardly projecting annular rib, a hub, and outwardly diverging means fixedly connected with the hub and with the rim at opposite sides of said rib.

2. A metal wheel comprising in combination an integral rim having an intermediate inwardly projecting annular rib, a hub, and separate outwardly diverging discs fixedly connected with the hub and with the rim at opposite sides of said rib.

3. A metal wheel comprising in combination an integral rim having its outer surface pressed inwardly circumferentially to form an inwardly projecting bead between its marginal portions, a hub, and outwardly diverging means fixedly connected with the hub and with the rim at opposite sides of said bead.

4. A metal wheel comprising in combination an integral rim having its outer surface pressed inwardly circumferentially to form an inwardly projecting annular bead extending continuously around the rim between its marginal portions, a hub, and outwardly diverging means fixedly connected with the hub and with the rim at opposite sides of said bead.

5. A metal wheel comprising in combination an integral rim having an intermediate inwardly projecting annular rib, a hub, and separate outwardly diverging discs fixedly connected with the hub and with the rim at opposite sides of said rib, the margins of the rim having inwardly extending flanges opposite to and abutting against the outer edges of said discs.

ROBERT J. BURROWS.